United States Patent

Pearl

[15] 3,693,489
[45] Sept. 26, 1972

[54] APPARATUS FOR CUTTING SHEET MATERIAL

[72] Inventor: David R. Pearl, West Hartford, Conn.

[73] Assignee: Gerber Garment Technology, Inc., East Hartford, Conn.

[22] Filed: March 25, 1971

[21] Appl. No.: 127,994

[52] U.S. Cl. .........................83/374, 83/452, 83/925
[51] Int. Cl. ..............................................B26d 5/00
[58] Field of Search........83/71, 72, 385, 201.02, 374, 83/375, 451, 452, 456, 925 GC

[56] References Cited

UNITED STATES PATENTS

| | | | |
|---|---|---|---|
| 3,573,859 | 4/1971 | Sederberg | 83/925 X |
| 3,561,313 | 2/1971 | Gerber | 83/925 X |
| 3,565,917 | 4/1970 | Heitzman | 83/72 |
| 2,503,353 | 4/1950 | Pugh | 83/374 |

*Primary Examiner*—Andrew R. Juhasz
*Assistant Examiner*—W. Donald Bray
*Attorney*—McCormick, Paulding & Huber

[57] ABSTRACT

Apparatus for cutting layups of sheet material and including an elongated table for supporting a layup, a main carriage supported for movement longitudinally of the table and a cutting tool supported on the main carriage for movement therewith and relative thereto in cutting engagement with the layup. The main carriage and the cutting tool move in response to positioning signals received from a numerically controlled or computerized controller. A pair of power driven hold-down rolls positioned at opposite sides of the cutting tool extend transversely of the table and move with the main carriage and in rolling engagement with the upper surface of the layup. At least one of the rolls is driven so that its tangential velocity at its point of contact with the layup is substantially equal to the lineal speed of the main carriage relative to the table but in the opposite direction. Thus, the one roll has a substantially zero velocity relative to the supporting table at its point of contact with the layup and exerts only a downwardly directed force upon the layup. Both rolls may be driven in the aforesaid manner, or, if desired, one of the rolls may be driven at a slightly different speed than the other roll to impart spreading action to the layup in the vicinity of the cutting tool.

9 Claims, 5 Drawing Figures

PATENTED SEP 26 1972　　　　　　　　　　　　　　　3,693,489
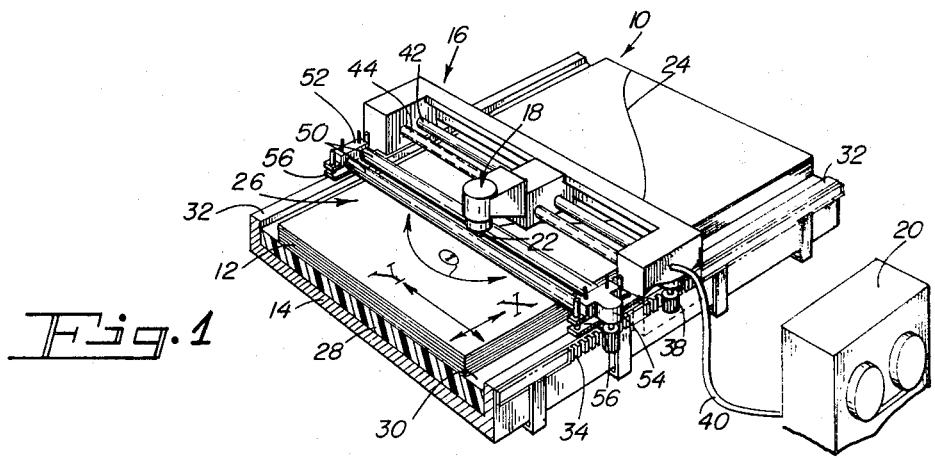
INVENTOR.
DAVID R. PEARL
By McCormick, Paulding & Huber
Attorneys

APPARATUS FOR CUTTING SHEET MATERIAL

BACKGROUND OF THE INVENTION

This invention relates in general to apparatus for working on sheet material and deals more particularly with improved apparatus for simultaneously cutting a plurality of component parts of substantially identical size and shape from a layup of sheet material comprising a plurality of sheets of material arranged in vertically stacked relation. Apparatus of the aforedescribed type ordinarily includes means for applying hold-down pressure to the layup in the region of the cutting tool. The provision of such hold-down means is particularly desirable when the apparatus includes a vertically reciprocable cutting tool. Pressure exerted upon the layup by the cutting action of the tool tends to cause localized compression or compaction of the layup which may be and usually is accompanied by some horizontal shifting movement of the upper-most layers of material relative to the lower layers thereof in the region of the cutting tool. This horizontal movement usually results in some variation in the size and shape of the component parts cut from the layup. If the hold-down means is arranged for movement with the cutting tool and relative to the layup, as is usually the case when an elongated layup is to be cut, the action of the holding means upon the layup is likely to produce some undesirable horizontal shifting movement of at least the upper layers of material. Heretofore, apparatus of this type has been provided which includes one or more pressure rolls arranged for movement with a cutting tool and in frictional rolling engagement with the upper surface of a layup to be cut. However, roll friction at the point of engagement with the layup produces a resultant horizontal force component which acts to some extent upon the layup to cause undesirable shifting movement as aforedescribed. The improved apparatus of the present invention is provided to overcome this problem.

SUMMARY OF THE INVENTION

In accordance with the present invention, a cutting apparatus is provided which has a layup supporting surface, a main carriage supported for movement longitudinally of the supporting surface and a cutting tool supported on the main carriage for movement therewith in cutting engagement with the layup. The apparatus also includes at least one hold-down roll positioned near the cutting tool and arranged for movement with the carriage and in rolling engagement with the layup. The roll is driven so that its point of contact with the layup has a substantially zero velocity relative to the layup supporting surface.

BRIEF DESCRIPTION OF THE DRAWING

FIG. 1 is a fragmentary perspective view of a cutting apparatus embodying the present invention.

FIG. 2 is a somewhat enlarged fragmentary side elevational view of the apparatus of FIG. 1.

FIG. 3 is a somewhat enlarged fragmentary plan view of the apparatus of FIG. 1.

FIG. 4 is a schematic fragmentary side elevational view of the apparatus of FIG. 1.

FIG. 5 is similar to FIG. 3, but shows another apparatus embodying the present invention.

DETAILED DESCRIPTION OF THE PREFERRED EMBODIMENTS

Referring now to the drawing, an apparatus embodying the present invention and indicated generally at 10 is particularly adapted for simultaneously cutting a plurality of substantially identical component parts from a spread or layup of sheet material 12 which comprises layers of sheet material arranged in face-to-face or face-up vertically stacked relation. The apparatus 10 includes a table 14 providing support for the layup 12 and a main carriage indicated generally at 16 bridging the table and supported for movement in one and an opposite direction relative thereto. A cutting tool indicated generally at 18 and supported on the main carriage for movement therewith and relative thereto in cutting engagement with the layup responds to positioning signals supplied by a numerically controlled or computerized controller 20. The cutting tool 18 includes a blade 22 capable of moving in cutting engagement with the layup 12 along any line such as indicated at 24 which may be either straight or curved as required in cutting a given component from the layup.

In accordance with the present invention, the apparatus 10 has a roll assembly indicated generally at 26 which includes at least one axially elongated hold-down roll positioned near the cutting tool and arranged for movement with the main carriage 16 and in rolling engagement with the exposed surface of the layup 12. The roll is positively driven so that as it moves along the upper surface of the layup it exerts only a downwardly directed force component upon the layup, as will be hereinafter further discussed.

The table 14 may take various forms, but preferably, and as shown, it includes a rigid frame providing support for a bed of resilient penetrable material 28 which defines an elongated generally horizontally disposed layup supporting surface 30. A pair of ways 32, 32 mounted on the frame of the table 14 at opposite sides of the supporting surface 30 provide support for the carriage 16. The table 14 also has an elongated rack 34 mounted in a fixed position thereon adjacent one of the ways 32, 32 and parallel thereto.

The carriage 16 is supported for movement in one and an opposite direction longitudinally of the supporting surface 30 by a plurality of rollers (not shown) arranged for rolling engagement with the top and side surfaces of the ways 32, 32. A reversible drive motor 36 mounted on the carriage drives an associated pinion 38 in engagement with the rack 34 to move the carriage longitudinally of the table or in a direction indicated by the arrow X in response to signals received from the controller 20, which is electrically connected to the carriage 16 by a supply line 40.

The cutting tool 18 is supported on the carriage 16 for movement transversely of the supporting surface 30 by a guide rod 42 which extends transversely of the carriage above the surface 30. A lead screw 44 supported on the carriage 16 in parallel alignment with the guide rod and driven by another reversible motor 46 drives the cutting tool in a transverse direction, as indicated by the arrow Y, in response to signals received from the controller 20. The cutting tool 18 includes a cutting head 48 in which the depending blade 22 is mounted. The blade 22 has a vertically disposed cutting edge, best shown in FIG. 4, and cuts with a vertically reciprocating motion. Preferably, the blade 22 is also arranged for rotation about its vertical axis in a direction indicated by the arrow 0 in response to signals received by the cutting head 48 from the controller 20. Thus, the blade 22 may be programmed to move in cutting engagement with a layup and along any predetermined path. The cutting head 48 is preferably further arranged for vertical movement relative to the carriage 16 so that the blade 22 may be raised from its normal cutting position, as it appears in FIG. 4, to an elevated position wherein it is located above the layup 12. Accordingly, when the cutting head 48 is raised, the sharpened lower extremity of the blade 22 is positioned above the layup 12 so that the cutting head and the blade may, if desired, be moved to any preselected position above the layup and then lowered to pierce the layup. In this manner, a cut may be started at any desired position on the layup and inwardly of the marginal edges thereof. When the cutting head 48 is in its lowered or cutting position, the sharpened free portion of the blade 22 is preferably arranged to slightly penetrate the bed 28 on each cutting stroke to assure smooth cutting engagement with the lower layers of the layup.

As previously noted, the roll assembly includes at least one axially elongated hold-down roll for exerting hold-down pressure on the layup in the region of the cutting tool as the tool moves relative to the supporting surface and in cutting engagement with the layup. However, in accordance with presently preferred practice, the illustrated roll assembly 26 includes a pair of parallel axially elongated hold-down rolls 50, 50 supported in longitudinally spaced-apart relation to receive the blade 22 therebetween, as best shown in FIG. 4. The roll assembly 26 further includes housings 52 and 54 for journalling the opposite ends of the rolls 50, 50. The roll assembly 26 is supported for movement with the carriage 16 and generally toward and away from the supporting surface 30 by a pair of brackets 56, 56 mounted at opposite sides of the carriage and extending outwardly therefrom in the direction of the ways 32, 32. Each bracket 56 carries a pair of spaced-apart upwardly extending guide pins 58, 58 on which an associated one of the housings 52 and 54 is slidably received.

Considering the housing 54 in further detail, a pair of threaded studs 60, 60 extend upwardly from the bracket 56 and through the housing 54. Each stud has an adjustment nut 61 threaded thereon and bearing against the housing 54. A spring 62 surrounds each screw 60 and acts between the bracket 56 and the housing 54 to bias the housing upwardly or away from the supporting surface 30. The housing 52 is supported and retained in a like manner. The springs 62, 62 cooperate to support the weight of the roll assembly. It will now be evident that by manipulating the adjustment nuts 61, 61, the roll assembly 26 may be drawn downwardly or toward the supporting surface 30. Thus, the adjustment nuts 61, 61 and the springs 60, 60 cooperate to provide means for adjusting pressure engagement between the roll assembly 26 and the layup so that the pressure exerted by the roll assembly upon the layup may be varied to suit the particular material to be cut.

In accordance with the present invention, at least one of the hold-down rolls which comprise the roll assembly is driven so that the tangential velocity of its peripheral surface at its point of contact with the layup is substantially equal to the lineal speed of the carriage longitudinally of the supporting surface 30 but in a direction opposite to the direction of carriage movement. Thus, the peripheral surface of the roll at its point of contact with the layup has substantially zero velocity relative to the layup supporting surface. Accordingly, the driven roll exerts only a downwardly directed force component upon the layup at its point of contact with the upper surface of the layup. When the hold-down roll is driven in the aforedescribed manner, it does not tend to cause horizontal movement of the upper layers of the layup relative to the lower ones.

In the illustrated embodiment 10, both rolls 50, 50 are driven in the aforedescribed manner and at substantially identical speed by a gear train which include gears 66, 66 mounted on the ends of the rolls 50, 50 within the housing 54 and a drive gear 68. A vertically elongated pinion 70 in driving engagement with the rack 34 is connected through bevel gears 72 and 74 to drive the gear 68 in response to movement of the carriage 16. The elongated pinion 70 is vertically movable relative to the rack 34 and remains in driving engagement with the rack 34 in all of the various positions of adjustment of roll assembly 26.

Referring now to FIG. 5, another apparatus embodying the invention is indicated generally at 10a. The apparatus 10a is similar in most respects to the apparatus 10 previously described but differs therefrom in the construction and arrangement of its roll assembly indicated at 26a. As in the previously described embodiment, the roll assembly 26a includes a pair of rolls indicated at 76 and 78, however, each of the latter rolls is driven by an individual drive motor, the motors being designated by numerals 80 and 82.

In the illustrated case, the roll 76 is driven by the motor 80 so that the tangential velocity of its peripheral surface at its point of contact with the upper surface of a layup is substantially equal to the lineal speed of the carriage 16a but in the direction opposite the direction of carriage movement. The motor 80 is or may be synchronized with the carriage drive motor (not shown). However, the speed of the other motor 82 and its associated roll 78 may be varied by manipulating a suitable motor controller such as indicated at 84. Thus, if the roll 78 is driven so that its peripheral speed differs slightly from the peripheral speed of the roll 76, it will be evident that the two rolls will cooperate to exert a spreading action upon the layup in the region of the blade located therebetween.

I claim:

1. An apparatus for cutting a layup of sheet material comprising means defining the longitudinally extending material supporting surface, a main carriage, means supporting said main carriage movement in one and an an opposite direction longitudinally of said supporting surface, a cutting tool supported on said main carriage for movement therewith in cutting engagement with a layup of material on said supporting surface, one axially elongated hold-down roll, means supporting said one roll near said cutting tool and with the axis thereof extending transversely of said supporting surface in general parallel alignment therewith for movement longitudinally of said supporting surface with said main carriage, said one roll having a generally cylindrical peripheral surface for rolling engagement with the layup, and drive means other than the engagement of said one roll with the layup for rotating said one roll about said axis in response to longitudinal movement of said main carriage to impart a tangential velocity to said peripheral surface which at the point of contact of said one roll with the layup is substantially equal to the lineal speed of said main carriage longitudinally of said supporting surface and in the opposite direction to said movement of said main carriage longitudinally of said supporting surface so that the peripheral surface of said one roll at said point of contact with the layup has a substantially zero velocity relative to said supporting surface.

2. An apparatus for cutting a layup of sheet material as set forth in claim 1 including drive means for moving said main carriage in said one and said opposite direction.

3. An apparatus for cutting a layup of sheet material as set forth in claim 2 wherein said drive means for moving said main carriage comprises said drive means for rotating said one roll.

4. An apparatus for cutting a layup of sheet material as set forth in claim 1 wherein said means supporting said one roll is further characterized as means supporting said one roll of movement generally toward and away from said supporting surface.

5. An apparatus for cutting a layup of sheet material as set forth in claim 4 wherein said drive means for rotating said one roll comprises a longitudinally extending rack mounted on said apparatus in a fixed position relative to said supporting surface and a pinion drivingly connected to said one roll and in meshing engagement with said rack.

6. An apparatus as set forth in claim 4 including means for adjusting the position of said one roll relative to said supporting surface.

7. An apparatus for cutting a layup of sheet material as set forth in claim 1 including another axially elongated hold-down roll, means supporting said other roll near said cutting tool and at the opposite side thereof from said one roll with the axis of said other roll extending transversely of said supporting surface in general parallel alignment therewith and with the axis of said one roll for movement longitudinally of said supporting surface with said main carriage, said other roll having a generally cylindrical peripheral surface for rolling engagement with the layup, and drive means other than the engagement of said other roll with said layup for rotating said other roll about its axis in response to longitudinal movement of said main carriage.

8. An apparatus for cutting a layup of sheet material as set forth in claim 7 wherein said means for rotating said other roll is further characterized as means for rotating said other roll to impart a tangential velocity to said peripheral surface thereof which at the point of contact of said other roll with the layup is substantially equal to the lineal speed of said main carriage longitudinally of said supporting surface in the direction opposite to said movement of said main carriage longitudinally of said supporting surface so that the peripheral surface of said other roll at said point of contact between said other roll and the layup has a substantially zero velocity relative to said supporting surface.

9. An apparatus for cutting a layup of sheet material as set forth in claim 7 wherein said drive means for rotating said other roll includes means for varying the speed of rotation of said other roll relative to said one roll.

* * * * *

PO-1050
(5/69)

UNITED STATES PATENT OFFICE
CERTIFICATE OF CORRECTION

Patent No. 3,693,489          Dated December 11, 1972

Inventor(s) David R. Pearl

It is certified that error appears in the above-identified patent and that said Letters Patent are hereby corrected as shown below:

Col. 3, line 3, "O" should read -- θ --.

Claim 1, line 4, after "carriage" insert --for--.

Claim 1, line 5, cancel "an".

Signed and sealed this 1st day of May 1973.

(SEAL)
Attest:

EDWARD M. FLETCHER, JR.
Attesting Officer

ROBERT GOTTSCHALK
Commissioner of Patents